United States Patent Office 2,764,597
Patented Sept. 25, 1956

2,764,597

ISOMERIZATION OF Δ4-CYCLOHEXENE 1,2-DI-CARBOXYLIC ACID ANHYDRIDE AND ESTERS

Arthur L. Barney, Deerhurst, Del., assignor to E. I. du Pont de Nemours and Company, Wilmington, Del., a corporation of Delaware No Drawing. Application December 2, 1954, Serial No. 472,763

9 Claims. (Cl. 260—346.3)

This invention relates to a new method of preparing derivatives of 1-cyclohexene-1,2-dicarboxylic acid, particularly its anhydride and esters.

This application is a continuation-in-part of copending application Ser. No. 402,410, filed January 5, 1954, by the applicant herein and Halsey B. Stevenson.

1-cyclohexene-1,2-dicarboxylic anhydride, also frequently referred to as $\Delta_1$-tetrahydrophthalic anhydride, has recently acquired considerable technical importance in the field of phthalocyanine-type pigments. As shown in British Patent 686,395 (see also Ficken and Linstead, J. Chem. Soc. 1952, 4846), new tetrazaporphin pigments of a definitely red tone are prepared by combining a suitable metal such as nickel with 1-cyclohexene-1,2-dicarboxylic anhydride or the corresponding dinitrile. These new pigments extend the range of colors of materials of this type. Their value is further enhanced by their good light stability and freedom from bleeding.

Heretofore no practical synthesis of 1-cyclohexene-1,2-dicarboxylic anhydride, or related compounds such as the acid or the diesters, has been known. Costly laboratory syntheses have been described, e. g., from ethyl cyclohexanone-2-carboxylate through the cyanohydrin (Kon and Nandi, J. Chem. Soc. 1933, 1633). The best starting material is 4-cyclohexene-1,2-dicarboxylic anhydride ($\Delta_4$-tetrahydrophthalic anhydride) which is readily and economically obtainable in quantitative yields by condensation of 1,3-butadiene with maleic anhydride (Cope and Herrick, Org. Syn. 30, 93 (1950)). The isomerization of the $\Delta_4$- to the $\Delta_1$-tetrahydrophthalic anhydride has been shown to be possible by von Baeyer in Ann. 258, 145–219 (1890). However, von Baeyer's procedure is not a practical one since, under the described conditions of heating the starting material followed by alkali treatment of the product, the isomerization is stepwise, i. e., yields first the $\Delta_3$, then the $\Delta_2$ and finally the $\Delta_1$ isomer, and the intermediate acids must be isolated and isomerized in turn, with of course attendant losses in yield.

This invention has as an object a direct process of isomerizing an anhydride or ester of $\Delta_4$-tetrahydrophthalic acid to the corresponding derivative wherein the double bond is attached to the 2 carbon. Other objects will appear hereinafter.

These objects are accomplished by the present invention wherein an anhydride or ester of a 4-cyclohexene-1,2-dicarboxylic acid is heated in the liquid phase at a temperature in the range from about 100° C. to about 225° C. in intimate contact with a catalytic amount of palladium or ruthenium.

The reaction which takes place when the anhydride is used is represented by the equation

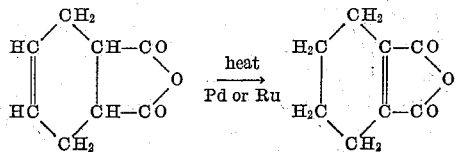

When a diester of 4-cyclohexene-1,2-dicarboxylic acid is used instead of the anhydride, the isomerization proceeds only as far as the $\Delta_2$-isomer, according to the equation

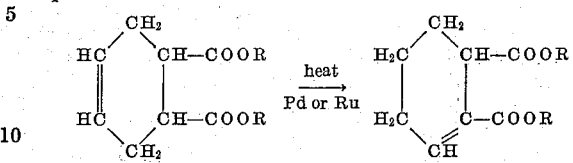

In both cases there results in a cyclohexene-1,2-dicarboxylic acid derivative in which the ring double bond is attached to the carbon atom in the 2-position. In other words, the ring double bond is always attached to at least one of the carbons bearing a carbonyl group. In the second case, it is readily possible to proceed further to the $\Delta_1$-isomer since the $\Delta_2$-ester is converted to the $\Delta_1$-anhydride by hydrolysis and simple heating of the resulting acid to its melting point.

Palladium and ruthenium are specific catalysts for the isomerization reaction. Closely related metals such as copper, rhodium, platinum, nickel and cobalt are ineffective as isomerization catalysts, as are also materials such as sodium acid sulfate, zinc chloride, cuprous chloride, aluminum chloride, nickel chloride, p-toluenesulfonic acid, potassium hydroxide, sodium methylate, copper chromite, iodine, reduced phosphomolybdic acid and alumina. Palladium gives better results than ruthenium and is the preferred isomerization catalyst. The catalyst can be used unsupported, e. g., as the finely divided metallic palladium or ruthenium or the oxides thereof, or impregnated on one of the conventional catalyst supports such as charcoal, asbestos, silica gel, kieselguhr, alumina and the like, in which case the total contact mass should desirably comprise between 1% and 20%, and preferably between 5% and 15% of its weight of active metal. The ratio of catalytic metal to the material to be isomerized is not highly critical. While this ratio can be as high as 1% or even higher, it is normally preferred to use not more than about 0.3% of catalytic metal by weight of the material to be isomerized, for the reason that with larger amounts the exothermic reaction which occurs at the start of the heating period may cause local overheating resulting in excessive side reactions and decrease in yields. On the other hand, it is desirable to use at least 0.01% of catalytic metal, the preferred amount being in the range of 0.03 to 0.25% of the weight of the isomerizable material.

The reaction is carried out in the liquid phase, that is, above the melting point of the 4-cyclohexene-1,2-dicarboxylic acid derivative employed or with the help of a high boiling, inert solvent such as dibutyl ether, ethyl adipate, butyl butyrate or the like if this is necessary, which is normally not the case. The reactant and the catalyst are kept intimately mixed throughout by efficient agitation. At temperatures below about 100° C. the isomerization is very slow, and at temperatures above about 225° C. side reactions such as disproportionation become preponderant. Thus, it is desirable to operate in the temperature range between 100 and 225° C., and preferably between about 100 and 120° C. when a diester of 4-cyclohexene-1,2-dicarboxylic acid is used and between 150 and 220° C. when the anhydride is used.

The reaction is normally carried out at atmospheric pressure but if desired, for example if a relatively volatile solvent is present, the reaction can be conducted in a closed vessel under the autogenous pressure developed at the operating temperature.

The isomerization reaction is mildly exothermic and a rise of the internal temperature is generally observed shortly after the start of the heating period. This is readily controlled by temporarily discontinuing the external heating as needed to prevent undesirable overheating of the reaction mixture.

In most cases, substantial isomerization is realized after a reaction period of about one hour at a temperature within the stated range. It is not necessary to prolong the reaction period for more than about 20 hours, and in general no appreciable increase in yield will occur after about eight hours' heating at the reaction temperature.

When 4-cyclohexene-1,2-dicarboxylic anhydride is the starting material, the progress of the isomerization can be followed by determining the setting temperature of a small sample of the reaction mixture. This decreases at first very rapidly from the initial melting point (103° C.) of the starting material to a very low value of the order of about 20–25° C., then rises again. A setting temperature of the order of about 40° C. indicates very substantial isomerization, i. e., a yield of 40% or better. A setting temperature of 55–60° C. shows good yields, e. g., 60–75% or higher.

After completion of the reaction, the catalyst is separated from the reaction mass by filtration. The desired product, i. e., the cyclohexene-1,2-dicarboxylic acid derivative having the ring double bond attached to the 2-carbon atom, can be isolated by fractional distillation or by crystallization from a suitable solvent. For example, 1-cyclohexene-1,2-dicarboxylic anhydride can be isolated by crystallization of the reaction mixture from a benzene-hexane mixture. The major impurities are the products formed by disproportionation of the starting material, chiefly phthalic anhydride and cyclohexane-dicarboxylic anhydride.

The following examples in which parts are by weight are illustrative of the invention:

*Example I*

A mixture of 200 parts of 4-cyclohexene-1,2-dicarboxylic anhydride and 3 parts of a finely divided catalyst consisting of charcoal impregnated with 10% by weight of palladium was stirred at 170–176° C. for 6 hours. The reaction product, which at this point had a setting temperature of 55° C., was dissolved in diethyl ether and the catalyst was separated by filtration. Evaporation of the solvent from the filtrate left 188 parts of solid material, from which 82 parts of 1-cyclohexene-1,2-dicarboxylic anhydride, M. P. 67–70° C., were obtained by two recrystallizations from a 2:1, by volume, mixture of n-hexane and benzene. Reworking of the mother liquors gave an additional 38 parts of 1-cyclohexene-1,2-dicarboxylic anhydride, which was thus obtained in 60% yield.

*Example II*

The procedure of Example I was repeated except that less catalyst was used (4 parts of 10% palladium-on-charcoal for 688 parts of 4-cyclohexene-1,2-dicarboxylic anhydride) and that the mixture was heated at 170–175° C. for 16 hours with careful temperature control of the initial mildly exothermic reaction. The crude reaction product had a setting point of 60° C. and the yield of 1-cyclohexene-1,2-dicarboxylic anhydride was of the order of 75%.

In experiments similar to those of Examples I and II except that the catalyst was 1% palladium-on-charcoal, of which 5 parts were used per 100 parts of the cyclohexene-1,2-dicarboxylic anhydride, there was obtained a lower yield, of the order of 20–25%, of 1-cyclohexene-1,2-dicarboxylic anhydride.

*Example III*

A mixture of 50 parts of 4-cyclohexene-1,2-dicarboxylic anhydride and 5 parts of a 10% palladium-on-charcoal catalyst was heated with intermittent stirring for 4 hours at 175–200° C. The reaction mixture was extracted with diethyl ether and the extract was filtered and concentrated to give 30 parts of crude reaction product, which on recrystallization from a petroleum ether/benzene mixture gave 24 parts of 1-cyclohexene-1,2-dicarboxylic anhydride, M. P. 64–66° C. It was further identified by its p-anisidine derivative, M. P. 95–96° C. (Abati and Contaldi, Gazz. Chim. Ital. 1906, 10).

*Example IV*

A mixture of 200 parts of 4-cyclohexene-1,2-dicarboxylic anhydride and 0.5 part of unsupported 100% ruthenium dioxide was heated with stirring for 1 hour at 175° C., 1 hour at 190° C., 1 hour at 210° C., and 3 hours at 220–223° C. The crude reaction product had a setting temperature of 42° C. Recrystallization from acetone, then benzene, gave 1-cyclohexene-1,2-dicarboxylic anhydride in about 45% yield.

*Example V*

A mixture of 500 parts of dimethyl 4-cyclohexene-1,2-dicarboxylate and 2 parts of a 10% palladium-on-charcoal catalyst was heated at 99–102° C. for a total of 7 hours. The catalyst was separated by filtration through kieselguhr and washed with methanol, and filtrate and washings together were distilled through an efficient fractionating column. There was obtained 282 parts (56% yield) of dimethyl 2-cyclohexene-1,2-dicarboxylate, B. P. 85° C. at 0.5 mm. pressure, $n_D^{25}$ 1.4792. This was further identified by saponification with aqueous methanolic sodium hydroxide and acidification of the resulting solution to give the free 2-cyclohexene-1,2-dicarboxylic acid, M. P. 210–215° C. without recrystallization. This acid was readily converted to 1-cyclohexene-1,2-dicarboxylic anhydride by heating it at 220–230° C. for 5 minutes, during which time water was driven off. The resulting product was 1-cyclohexene-1,2-dicarboxylic anhydride, as shown by its melting point and mixed melting point with an authentic sample. This simultaneous dehydration and isomerization of 2-cyclohexene-1,2-dicarboxylic acid to 1-cyclohexene-1,2-dicarboxylic anhydride had already been observed by Von Baeyer (loc. cit.).

*Example VI*

A mixture of 60 parts of 4-cyclohexene-1,2-dicarboxylic anhydride and 6 parts of a 10% palladium-on-alumina catalyst was heated at 150° C. for 6 hours with intermittent agitation. The reaction product, which did not solidify completely when allowed to cool to room temperature, was extracted three times with 50 parts (by volume) portions of hot benzene, the extracts were combined, filtered, and concentrated. The residue, which was non-crystalline, was hydrolyzed with water at 95–100° C., giving an acidic material which melted over a wide range. Recrystallization of this product from water gave a small amount of 4-cyclohexene-1,2-dicarboxylic acid, M. P. 167–169° C. The residue consisted of a mixture of cyclohexene dicarboxylic acids, as judged from its solubility properties and melting point behavior.

Extraction of the catalyst residues with 10% aqueous sodium hydroxide and subsequent acidification of the alkaline solution gave 6 parts of a product melting at 205–208° C. (uncorrected) with decomposition. This was 2-cyclohexene-1,2-dicarboxylic acid, for which Baeyer (loc. cit.) gives a melting point of 215° C. with decomposition. Its identity was further established by converting it to 1-cyclohexene-1,2-dicarboxylic anhydride by heating it until bubbling ceased (20 minutes) at 225–250° C. The resulting product, upon dissolving in diethyl ether, washing with aqueous sodium bicarbonate solution and crystallization from diethyl ether, melted at 68–71° C. It was further identified as 1-cyclohexene-1,2-dicarboxylic anhydride by its reaction with p-anisidine giving a derivative melting at 96° C., the value given by Abati and Contaldi in Gazz. Chim. Ital. 1906, 10.

This example shows that isomerization took place with palladium-on-alumina but that the isomerized product was strongly absorbed by the catalyst.

The process of this invention has been specifically illustrated with the anhydride and the dimethyl ester of 4-cyclohexene-1,2-dicarboxylic acid. However, it is applicable to other diesters, of which the preferred ones are those with monohydric hydrocarbon alcohols, i. e., alcohols which contain only carbon and hydrogen except for the hydroxyl oxygen, and more particularly the esters of aliphatically saturated hydrocarbon alcohols, i. e., monohydric hydrocarbon alcohols free from non-aromatic unsaturation, of 1 to 6 carbon atoms, such as the diethyl, di-n-propyl, di-n-butyl, di-isobutyl, di-tert.-amyl, di-n-hexyl, dicyclohexyl and diphenyl esters of 4-cyclohexene-1,2-dicarboxylic acid. The process is most useful when applied to the anhydride (the preferred reactant) and the dialkyl esters, wherein the alkyl groups have from 1 to 6 carbon atoms, of 4-cyclohexene-1,2-dicarboxylic acid.

These starting materials can be prepared by reaction of maleic anhydride or maleic esters with 1,3-butadiene or 1,3-butadienes bearing one or more simple hydrocarbon substituents, the latter being inert in the subsequent isomerization reaction. Many of these maleic anhydride/substituted butadiene adducts have been described in the chemical literature, see, e. g., the comprehensive article by J. A. Norton in Chemical Reviews 31 (1942), pp. 319–523, particularly Table 2. Thus, there can be used in the process of this invention the anhydrides or esters of 4-cyclohexene-1,2-dicarboxylic acids having from one to three hydrocarbon substituents attached to the ring carbons not bearing the carboxyl groups, i. e., carbons of the ring numbered higher than 2. These substituents are preferably aliphatically saturated hydrocarbon radicals, i. e., hydrocarbon radicals free from non-aromatic unsaturation, having from 1 to 6 carbon atoms. Thus, there can be used the anhydrides or diesters of 4-methyl-; 4,5-dimethyl-; 3-methyl-; 3,6-dimethyl-; 3,3,5-trimethyl-; 3-isopropyl-; 3-phenyl-; 3,6-diphenyl-; 3-phenyl-6-methyl-4-cyclohexene-1,2-dicarboxylic acid, and the like.

As already mentioned, this invention is especially useful in providing a simple and convenient method of synthesizing the starting materials for new phthalocyanine-type pigments by the methods of the above identified British patent and the Ficken and Linstead reference. Another important use for the anhydride and dimethyl ester of 1-cyclohexene-1,2-dicarboxylic acid obtainable by the process of this invention is in the synthesis of 2,3-dicarbomethoxy-1,3-butadiene by the pyrolytic method disclosed in application Serial No. 402,410, filed on January 5, 1954, by A. L. Barney and H. B. Stevenson. 2,3-dicarbomethoxy-1,3-butadiene is a source of technically valuable polymers and copolymers.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the isomerization of a Δ4-cyclohexene-1,2-dicarboxylic acid compound having the Δ4 unsaturation as the only non-aromatic carbon-carbon unsaturation and having at most three other substituents on the cyclohexene ring and these being hydrocarbon radicals of at most six carbon atoms on carbons of the ring numbered higher than 2, containing only carbon, hydrogen, and oxygen of the named carboxyls, and selected from the class consisting of the self-anhydrides and alkyl esters of the acid, which comprises bringing said Δ4-cyclohexenedicarboxylic acid compound in contact, in the liquid phase at a temperature from about 100° C. to about 225° C., with a catalytic amount of a catalyst of the class consisting of palladium and ruthenium.

2. Process for the isomerization of a Δ4-cyclohexene-1,2-dicarboxylic acid compound having the Δ4 unsaturation as the only non-aromatic carbon-carbon unsaturation and having at most three other substituents on the cyclohexene ring and these being hydrocarbon radicals of at most six carbon atoms on carbons of the ring numbered higher than 2, containing only carbon, hydrogen, and oxygen of the named carboxyls, and selected from the class consisting of self-anhydrides and alkyl esters of the acid, which comprises bringing said Δ4-cyclohexenedicarboxylic acid compound in contact, in the liquid phase at a temperature from about 100° C. to about 225° C., with a catalytic amount of a palladium catalyst.

3. Process for the isomerization of a Δ4-cyclohexene-1,2-dicarboxylic acid anhydride having at most three substituents other than the carboanhydride group and these being hydrocarbon radicals of at most six carbons on carbons of the ring other than the carboanhydride bearing carbons, said anhydride having the Δ4 unsaturation as the only non-aromatic carbon-carbon unsaturation and being hydrocarbon except for the carboxyl oxygens, which comprises bringing said anhydride in contact, in the liquid phase at a temperature from about 100° C. to about 225° C., with a catalytic amount of a catalyst of the class consisting of palladium and ruthenium.

4. Process for the isomerization of a Δ4-cyclohexene-1,2-dicarboxylic acid anhydride having at most three substituents other than the carboanhydride group and these being hydrocarbon radicals of at most six carbons on carbons of the ring other than the carboanhydride bearing carbons, said anhydride having the Δ4 unsaturation as the only non-aromatic carbon-carbon unsaturation and being hydrocarbon except for the carboxyl oxygens, which comprises bringing said anhydride in contact, in the liquid phase at a temperature from about 100° C. to about 225° C., with a catalytic amount of a palladium catalyst.

5. Process for the isomerization of a Δ4-cyclohexene-1,2-dicarboxylic acid anhydride having at most three substituents other than the carboanhydride group and these being hydrocarbon radicals of at most six carbons on carbons of the ring other than the carboanhydride bearing carbons, said anhydride having the Δ4 unsaturation as the only non-aromatic carbon-carbon unsaturation and being hydrocarbon except for the carboxyl oxygens, which comprises bringing said anhydride in contact, in the liquid phase at a temperature from 150° C. to about 220° C., with a catalytic amount of a palladium catalyst.

6. Process for the isomerization of Δ4-cyclohexene-1,2-dicarboxylic acid anhydride which comprises bringing said anhydride in contact, in the liquid phase at a temperature from about 150° C. to about 220° C., with a catalytic amount of a catalyst of the class consisting of palladium and ruthenium.

7. Process for the isomerization of Δ4-cyclohexene-1,2-dicarboxylic acid anhydride which comprises bringing said anhydride in contact, in the liquid phase at a temperature from about 150° C. to about 220° C., with palladium-on-carbon catalyst.

8. Process for the isomerization of a Δ4-cyclohexene-1,2-dicarboxylic acid compound having the Δ4 unsaturation as the only non-aromatic carbon-carbon unsaturation, having at most three other substituents and these being hydrocarbon radicals of at most six carbons on carbons of the ring numbered higher than 2, containing only carbon, hydrogen, and oxygen of the named carboxyls, and selected from the class consisting of the self-anhydrides and monohydric alcohol esters of the acid, which comprises bringing said Δ4-cyclohexenedicarboxylic acid compound in contact, in the liquid phase at a temperature from about 100° C. to about 225° C., with a catalytic amount of a catalyst of the class consisting of palladium and ruthenium.

9. Process for the isomerization of a Δ4-cyclohexene-1,2-dicarboxylic acid self-anhydride having the Δ4 unsaturation as the only non-aromatic carbon-carbon unsaturation, having at most three other substituents and these being hydrocarbon radicals of at most six carbons on carbons of the ring numbered higher than 2 and containing only carbon, hydrogen, and oxygen of the named carboxyls which comprises bringing said $\Delta_4$-cyclohexene-dicarboxylic acid anhydride in contact, in the liquid phase at a temperature from about 150° C. to about 220° C., with a catalytic amount of a catalyst of the class consisting of palladium and ruthenium.

No references cited.